(12) United States Patent
Wheatman

(10) Patent No.: US 9,052,036 B2
(45) Date of Patent: Jun. 9, 2015

(54) EXTENSION ASSEMBLY FOR FAUCETS

(76) Inventor: James P. Wheatman, Chesterton, IN (US)

( * ) Notice: Subject to any disclaimer, the term of this patent is extended or adjusted under 35 U.S.C. 154(b) by 231 days.

(21) Appl. No.: 13/532,041

(22) Filed: Jun. 25, 2012

(65) Prior Publication Data

US 2012/0325336 A1  Dec. 27, 2012

Related U.S. Application Data

(60) Provisional application No. 61/500,194, filed on Jun. 23, 2011.

(51) Int. Cl.
 *F16K 43/00* (2006.01)
 *F16K 31/46* (2006.01)
 *E03C 1/04* (2006.01)

(52) U.S. Cl.
 CPC ............... *F16K 31/46* (2013.01); *E03C 1/0401* (2013.01); *E03C 1/0403* (2013.01)

(58) Field of Classification Search
 CPC ......... E03C 1/04; E03C 1/052; E03C 1/0401; E03C 1/0403; F16K 5/00; F16K 5/08; F16K 31/445; F16K 31/46
 USPC ............ 137/315.01, 315, 315.12, 801; 4/675, 4/676, 677, 678; 251/293, 294
 See application file for complete search history.

(56) References Cited

U.S. PATENT DOCUMENTS

| | | |
|---|---|---|
| 937,577 A | 10/1909 | Crump |
| 1,781,203 A | 11/1930 | Teleki |
| 2,407,217 A | 9/1946 | Banneyer |
| 2,684,025 A | 7/1954 | Kurth |
| 3,028,645 A | 4/1962 | Stearman et al. |
| 3,029,831 A * | 4/1962 | Leete .............. 137/360 |
| 3,414,220 A | 12/1968 | Walker |
| 3,563,131 A | 2/1971 | Ridley, Sr. |
| 3,893,363 A | 7/1975 | Cohen |
| 4,240,603 A | 12/1980 | Chiariello |
| 4,662,389 A * | 5/1987 | Igbal ............... 137/359 |
| 4,796,348 A * | 1/1989 | Rosen ............ 29/401.1 |
| 4,852,192 A * | 8/1989 | Viegener ............ 4/678 |
| 4,934,411 A | 6/1990 | Albrecht |
| 5,050,246 A | 9/1991 | Huntoon |
| 5,119,556 A * | 6/1992 | Hseu ................. 29/264 |
| 5,257,824 A * | 11/1993 | Eggen ............ 285/101 |
| 5,637,033 A | 6/1997 | Williams |
| 5,787,675 A | 8/1998 | Futagi |
| 5,860,634 A * | 1/1999 | Marty et al. ........... 251/297 |
| 6,318,924 B1 | 11/2001 | Schiavo, Jr. |
| 6,431,610 B1 * | 8/2002 | Ohirano et al. ......... 285/32 |
| 7,168,450 B2 * | 1/2007 | Dulin ............ 137/614.2 |
| 7,404,413 B2 * | 7/2008 | Chang ............ 137/606 |

* cited by examiner

*Primary Examiner* — John K Fristoe, Jr.
*Assistant Examiner* — Kevin Barss
(74) *Attorney, Agent, or Firm* — Hartman Global IP Law; Gary M. Hartman; Michael D. Winter

(57) ABSTRACT

An extension assembly for effectively extending a faucet stem to facilitate the maintenance of a faucet assembly. The extension assembly includes a stem extender which connects to a faucet stem, an extension tube which fits over the stem extender and determines the length by which the faucet stem is extended, and an optional adapter for interfacing between the faucet stem and the stem extender.

18 Claims, 2 Drawing Sheets

EXTENSION ASSEMBLY FOR FAUCETS

CROSS REFERENCE TO RELATED APPLICATIONS

This application claims the benefit of U.S. Provisional Application No. 61/500,194 filed Jun. 23, 2011, the contents of which are incorporated herein by reference.

BACKGROUND OF THE INVENTION

The present invention generally relates to faucet and plumbing fixtures. More particularly, this invention relates to an assembly for effectively extending faucet stems so as to facilitate the repair, maintenance and replacement of a faucet.

Currently, it can be very difficult to repair, maintain and replace faucet systems, since the hardware conventionally used to secure faucets to sinks or other structures is typically located within a tight space within a cabinet as a result of the sink to which the faucet is mounted. Therefore, there is a need to facilitate access to such hardware to facilitate the repair, maintenance and replacement of faucet assemblies.

BRIEF DESCRIPTION OF THE INVENTION

The present invention provides an extension assembly adapted to serve as an extension for a faucet stem. The assembly is applicable to any form of faucet, including but not limited to ball, disc, or compression faucets having one or more handles.

According to a first aspect of the invention, the extension assembly includes a stem extender having a hollow interior entirely therethrough, and an extension tube having a hollow interior entirely therethrough that is sized to fit over the stem extender. The stem extender includes an internal thread within an upper portion thereof and an external thread at a lower portion thereof. The internal thread is adapted for threadably coupling with a threaded stem of a faucet assembly. The extension assembly further includes a nut adapted to threadably couple with the external thread of the stem extender to secure the extension tube on the stem extender.

An optional aspect of the invention is the inclusion of an adapter for installation between the faucet stem and the stem extender. The adapter has an internal thread within an upper portion thereof for threadably coupling with the stem and an external thread at a lower portion thereof for threadably coupling with the internal thread within the upper portion of the stem extender.

Other aspects and advantages of this invention will be better appreciated from the following detailed description.

DETAILED DESCRIPTION OF THE INVENTION

To facilitate the following description, terms such as "upper," "lower," "above," "below," "right," "left," etc., will be used in reference to the view shown in FIG. 1, and are relative terms that indicate the construction, installation and use of the invention and therefore help to define the scope of the invention.

Figure 1:
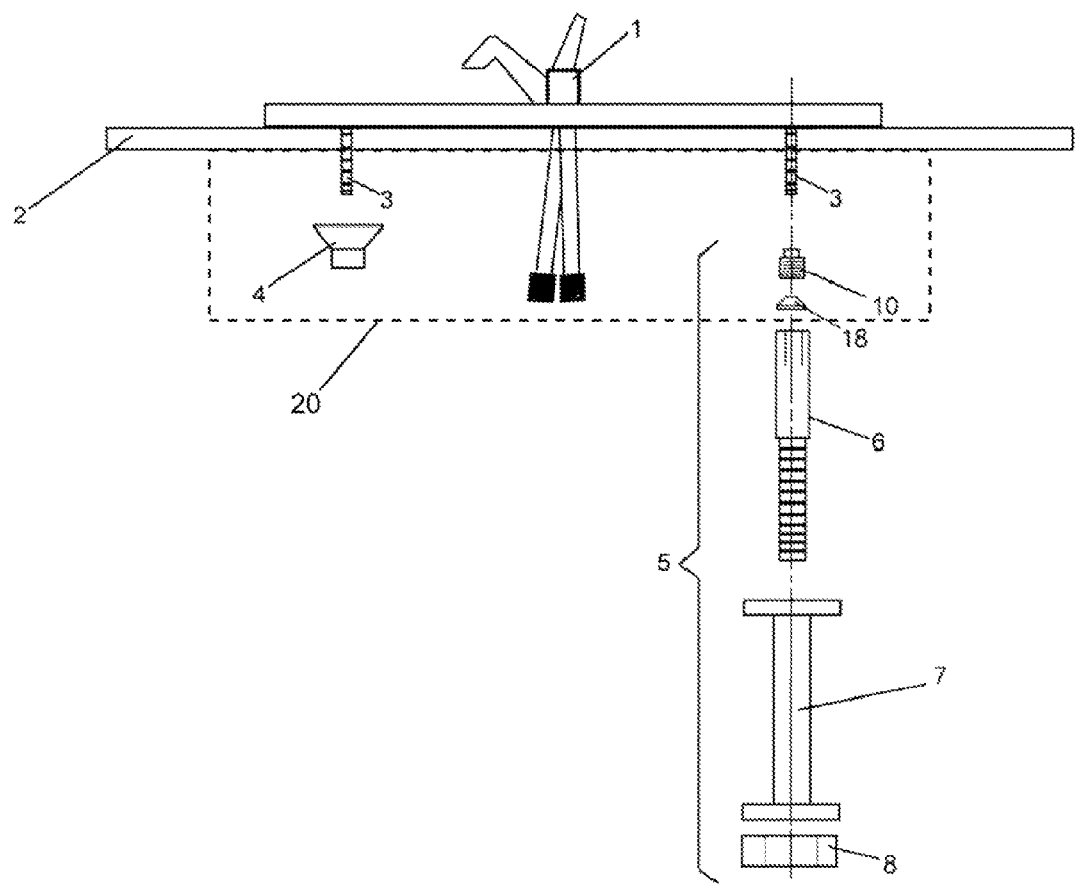
FIG. 1 illustrates an embodiment of an extension assembly of the present invention, as well as an example of conventional hardware for attaching a faucet assembly to a sink.

FIG. 1 schematically depicts a faucet assembly 1 mounted to a sink 2. As should be readily understood, the sink 2 may be of any type to which a faucet assembly might be mounted, and the sink 2 may be mounted to a cabinet or any other suitable structure. While shown as a single-handle faucet assembly whose handle 1A is integrated into the spigot 1B, from the following discussion it will become apparent that multiple-handle faucet assemblies are also within the scope of the invention. Furthermore, the faucet assembly 1 could be of the type that has a single handle or two handles spaced apart and to either or both sides of the spigot 1B, as well as a sprayer that is separate from or integrated with the spigot 1B. As is conventional, the faucet assembly 1 includes threaded stems 3 that extend downward through the top of the sink 2, by which the faucet assembly 1 can be secured to the sink 2. The area represented in FIG. 1 would typically be located behind a sink bowl 20 with which the faucet assembly 1 is installed. On the lefthand side of FIG. 1, a conventional nut 4 is represented as being positioned for threading onto the lefthand stem 3 of the faucet assembly 1. The stem 3 and nut 4 form a common configuration for fastening a faucet to a sink, and therefore will not be described in any further detail.

Figure 2:
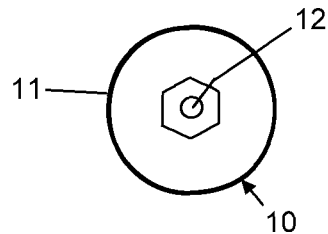
FIGS. 2 and 3 represent top view and cross-sectional views of an adapter for use with the extension assembly of FIG. 1.
Figure 3:
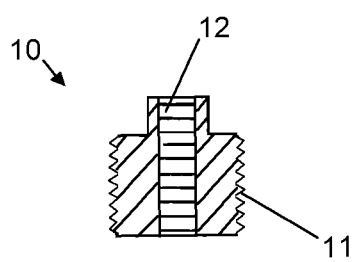
Figure 4:
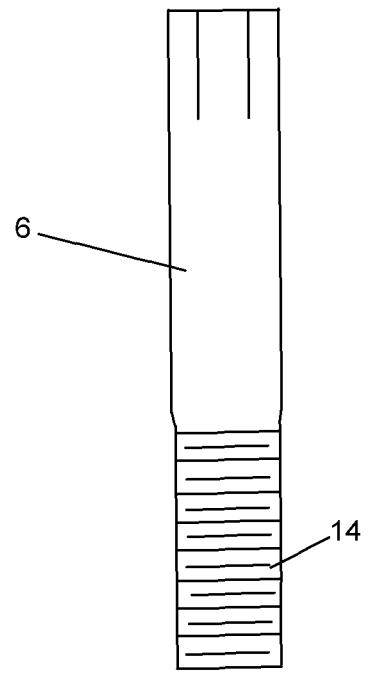
FIG. 4 is a side view of a stem extender of the extension assembly of FIG. 1.

An exploded view of an extension assembly 5 according to an embodiment of the invention is represented in the right-hand side of FIG. 1. Various components of the assembly 5 are represented (not to scale) in FIGS. 2 through 6. The extension assembly 5 is represented in FIG. 1 as including a stem extender 6, a floating extension tube 7, a nut 8 and an adapter 10. For use with the single-handled faucet assembly represented in FIG. 1, the invention utilizes the adapter 10 which, as more readily apparent in FIGS. 2 and 3, has female threads 12 adapted to thread onto the external (male) threads of the stem 3, and has male threads 11 adapted to thread into internal (female) threads located within a bore 9 in the upper end of the extender 6. For certain types of faucets, for example, two-handled faucets, the adapter 10 is not required and the threaded bore 9 within the upper end of the stem extender 6 enables the extender 6 to be directly threaded onto the stem 3.

The stem extender 6 is adapted for assembly with the extension tube 7 by sliding the tube 7 onto the exterior of the extender 6. The lower end of the stem extender 6 is provided with male threads 14, allowing the nut 8 to be threaded onto the extender 6 to secure the extension tube 7 on the extender 6. By tightening the nut 8, the upper end of the tube 7 is forced into engagement with the sink 2 to secure the faucet assembly 1 to the sink 2.

FIG. 1 evidences the relative advantage provided by the current invention over the conventional method provided by the nut 4 and stem 3. Those knowledgeable in the art will appreciated that access to the nut 4 is typically complicated by the presence of a sink bowl 20 (represented in phantom in FIG. 1, which may extend a considerable distance downward from the sink 2. In contrast, by installing the extension assembly 5 instead of the nut 4, the length of the extension tube 7 effectively lowers the location of the nut 8 relative to that of the conventional nut 4, with the result that the nut 8 of the extension assembly 5 is far more accessible and, as a result, much easier to fasten and loosen.

Figure 5A:
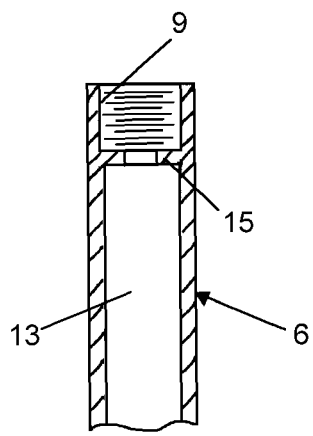
FIGS. 5a and 5b represent two cross-sectional views of alternative configurations for the stem extender of FIG. 4.
Figure 5B:
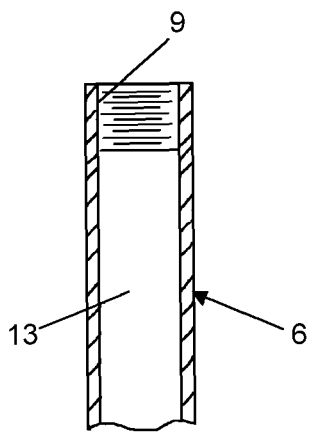

From the cross-sectional view of the stem extender 6 depicted in FIGS. 5a and 5b, it can be seen that, in addition to the threaded bore 9 in its upper end, the remainder of the stem extender 6 defines a hollow cavity 13. In FIG. 5a, a shoulder 15 is between the threaded bore 9 and the cavity 13 of the extender 6, and the shoulder 15 defines an opening that fluidically connects the internally threaded upper end of the extender 6 with the cavity 13 within the remainder of the extender 6. As required for conventional two-handle faucet installations in which each stem 3 is hollow and water flows through the stem 3 to the faucet, the opening defined by the shoulder 15 allows water to flow from the upper section to the lower section of the extender 6, and then through a hose (not shown) to the faucet 1. The shoulder 15 is preferably configured to accept a flat or cone washer 18 (FIG. 1) that prevents leakage at the interface with the stem 3. In FIG. 5b, the shoulder 15 and its opening are omitted for use in a faucet assembly in which a waterline (not shown) is directly connected to the stem 3, in which case it is preferred that the waterline extends entirely through the extender 6 to the stem 3. Such a configuration for the extender 6 may be desired or necessary for single- and double-handle faucet assemblies whose handle or handles are spaced apart from a spigot, and may also be utilized for sprayers, soap dispensers and other devices that may be associated with the faucet and mounted directly to the sink or to a cabinet or counter top on which the sink is installed.

Figure 6:
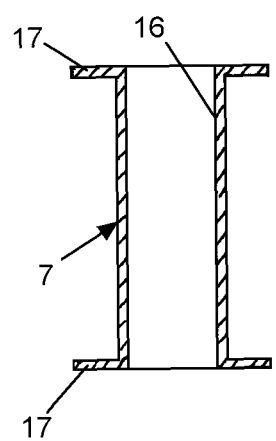
FIG. 6 is a cross-sectional view of an extension tube of the extension assembly of FIG. 1.

FIG. 6 is a cross-sectional view of the extension tube 7. As evident from the foregoing, the extension tube 7 has a hollow interior 16 entirely therethrough to enable its installation over the exterior of the stem extender 6. The tube 7 is free-floating in that it lacks any internal or external threads by which the tube 7 is directly secured to the extender 6, enabling the tube 7 to move freely over the extender 6. Each of the axial ends of the tube 7 is defined by a flange 17, which in combination help to distribute the clamping force generated as the tube 7 is brought into engagement with the sink 2 when the nut 8 is tightened on the male threads 14 of the stem extender 6.

The extension assembly 5 may be installed by first screwing the adapter 10, if present, onto the extender 6. Next, the adapter 10 and extender 6 are screwed onto the stem 3 of the faucet assembly 1. The faucet assembly 1 is then installed on the sink 2 by sliding the extender 6 through the top of the sink 2. The extension tube 7 is then slid over a portion of the extender 6 exposed under the sink 2. Finally, the nut 8 is screwed on the end of the extender 6 to secure the faucet assembly 1 and extension assembly 5 to the sink 2.

While the invention has been described in terms of a particular embodiment, it is apparent that other forms could be adopted by one skilled in the art. For example, the physical configuration of the components of the extension assembly 5 could differ from those shown, and the components could be fabricated from various materials using various processes. Therefore, the scope of the invention is to be limited only by the following claims.

The invention claimed is:

1. An extension assembly installed on a threaded stem of a faucet assembly, the faucet assembly being installed on a sink, the threaded stem having a lowermost portion that is located above a lowermost portion of a bowl of the sink, the extension assembly comprising:

a stem extender having a hollow interior entirely therethrough, the stem extender comprising an internally threaded bore within an upper portion thereof for threadably coupling with the threaded stem and an external thread at a lower portion thereof, the stem extender being secured to the threaded stem;

an extension tube having a hollow interior entirely therethrough, the extension tube being assembled with the stem extender so that the stem extender extends through the hollow interior of the extension tube; and a nut threadably coupled with the external thread of the stem extender and securing the extension tube on the stem extender and securing the faucet assembly to the sink, wherein the stem extender and the extension tube have longitudinal lengths such that the nut is at a location below the lowermost portion of the bowl of the sink.

2. The extension assembly according to claim 1, further comprising an adapter having an internal thread within an upper portion thereof threadably coupled with the threaded stem and an external thread at a lower portion thereof threadably coupled with the internally threaded bore within the upper portion of the stem extender.

3. The extension assembly according to claim 2, wherein the threaded stem of the faucet assembly is entirely received within the internal thread within the upper portion of the adapter such that the upper portion of the adapter is in direct contact with a lower portion of the faucet assembly.

4. The extension assembly according to claim 1, wherein the hollow interior of the stem extender comprises the internally threaded bore within the upper portion of the stem extender, a hollow cavity within the lower portion of the stem extender, and a shoulder therebetween, the shoulder defining an opening that fluidically connects the internally threaded bore within the upper portion of the stem extender with the cavity within the lower portion of the stem extender.

5. The extension assembly according to claim 1, wherein the hollow interior of the stem extender comprises the internally threaded bore within the upper portion of the stem extender and a hollow cavity within the lower portion of the stem extender, and the internally threaded bore and cavity are continuous so as to enable a waterline to pass entirely through the stem extender.

6. An extension assembly installed on a threaded stem of a faucet assembly, the faucet assembly being installed on a sink, the threaded stem having a lowermost portion that is located above a lowermost portion of a bowl of the sink, the extension assembly comprising:

a stem extender having a hollow interior entirely therethrough, the stem extender comprising an internally threaded bore within an upper portion thereof that is threadably coupled with the threaded stem and an external thread at a lower portion thereof;

an extension tube having a hollow interior entirely therethrough, the extension tube being assembled with the stem extender so that the stem extender extends through the hollow interior of the extension tube; and a nut threadably coupled with the external thread of the stem extender and securing the extension tube on the stem extender and securing the faucet assembly to the sink, wherein the faucet assembly is configured to be unsecured from the sink by threadably de-coupling the nut from the stem extender, sliding the extension tube off of the stem extender, and then removing the faucet assembly from the sink with the stem extender still threadably coupled to the threaded stem of the faucet assembly.

7. The extension assembly according to claim 6, wherein the stem extender and extension tube have longitudinal lengths such that the nut is at a location below the lowermost portion of the bowl of the sink.

8. The extension assembly according to claim 6, wherein the hollow interior of the stem extender comprises the internally threaded bore within the upper portion of the stem extender, a hollow cavity within the lower portion of the stem extender, and a shoulder therebetween, the shoulder defining an opening that fluidically connects the internally threaded bore within the upper portion of the stem extender with the cavity within the lower portion of the stem extender.

9. The extension assembly according to claim 6, wherein the hollow interior of the stem extender comprises the internally threaded bore within the upper portion of the stem extender and a hollow cavity within the lower portion of the stem extender, and the internally threaded bore and cavity are continuous so as to enable a waterline to pass entirely through the stem extender.

10. The extension assembly according to claim 6, wherein the faucet assembly is a single-handled faucet assembly.

11. An extension assembly installed on a threaded stem of a faucet assembly, the faucet assembly being installed on a sink, the threaded stem having a lowermost portion that is above a lowermost portion of a bowl of the sink, the extension assembly comprising:
    an adapter having an internal thread within an upper portion thereof and an external thread at a lower portion thereof, the internal thread being threadably coupled with the threaded stem;
    a stem extender having a hollow interior entirely therethrough, the stem extender comprising an internally threaded bore within an upper portion thereof and an external thread at a lower portion thereof, the internally threaded bore being threadably coupled with the external thread of the adapter;
    an extension tube having a hollow interior entirely therethrough, the extension tube being assembled with the stem extender so that the stem extender extends through the hollow interior of the extension tube; and
    a nut threadably coupled with the external thread of the stem extender and securing the extension tube on the stem extender and securing the faucet assembly to the sink,
    wherein the faucet assembly is configured to be unsecured from the sink by threadably de-coupling the nut from the stem extender, sliding the extension tube off of the stem extender, and then removing the faucet assembly from the sink with the adapter and the stem extender still threadably coupled to the threaded stem of the faucet assembly.

12. The extension assembly according to claim 11, wherein the hollow interior of the stem extender comprises the internally threaded bore within the upper portion of the stem extender, a hollow cavity within the lower portion of the stem extender, and a shoulder therebetween, the shoulder defining an opening that fluidically connects the internally threaded bore within the upper portion of the stem extender with the cavity within the lower portion of the stem extender.

13. The extension assembly according to claim 11, wherein the hollow interior of the stem extender comprises the internally threaded bore within the upper portion of the stem extender and a hollow cavity within the lower portion of the stem extender, and the internally threaded bore and cavity are continuous so as to enable a waterline to pass entirely through the stem extender.

14. The extension assembly according to claim 11, wherein the faucet assembly is a single-handled faucet assembly.

15. The extension assembly according to claim 11, wherein the threaded stem of the faucet assembly is entirely received within the internal thread within the upper portion of the adapter such that the upper portion of the adapter is in direct contact with a lower portion of the faucet assembly.

16. The extension assembly according to claim 11, wherein the stem extender and extension tube have longitudinal lengths such that the nut is at a location below the lowermost portion of the bowl of the sink.

17. A method of installing the faucet assembly of claim 1 to the sink, the method comprising:
    threadably coupling the internally threaded bore within the upper portion of the stem extender with the threaded stem;
    sliding the lower portion of the stem extender through a top of the sink such that the faucet assembly rests on the top of the sink;
    sliding the extension tube over a portion of the stem extender exposed under the sink; and
    threadably coupling the nut with the external thread of the stem extender such that the extension tube is secured on the stem extender and the faucet assembly is secured to the sink.

18. A method of installing the faucet assembly of claim 2 to the sink, the method comprising:
    threadably coupling the internal thread within the upper portion of the adapter with the threaded stem;
    threadably coupling the external thread at the lower portion of the adapter with the internally threaded bore within the upper portion of the stem extender;
    sliding the lower portion of the stem extender through a top of the sink such that the faucet assembly rests on the top of the sink;
    sliding the extension tube over a portion of the stem extender exposed under the sink; and
    threadably coupling the nut with the external thread of the stem extender such that the extension tube is secured on the stem extender and the faucet assembly is secured to the sink.

* * * * *